United States Patent
Camp et al.

(10) Patent No.: US 7,147,921 B2
(45) Date of Patent: Dec. 12, 2006

(54) ANTI-FOULING COATINGS CONTAINING SILICA-COATED COPPER

(75) Inventors: Douglas R. Camp, Gibsonia, PA (US); Steven R. Zawacky, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 248 days.

(21) Appl. No.: 10/407,737

(22) Filed: Apr. 4, 2003

(65) Prior Publication Data

US 2004/0197564 A1 Oct. 7, 2004

(51) Int. Cl.
- B32B 27/38 (2006.01)
- B32B 27/20 (2006.01)
- B32B 33/00 (2006.01)
- B32B 37/00 (2006.01)

(52) U.S. Cl. ............... 428/418; 428/404; 523/457; 523/466

(58) Field of Classification Search ............... 523/458, 523/466, 122, 216, 210, 177, 400; 524/440; 106/14.05, 14.34, 14.39; 428/404, 450, 446, 428/403, 407; 427/421, 385, 386; 119/234, 119/236

See application file for complete search history.

(56) References Cited

U.S. PATENT DOCUMENTS

| | | | |
|---|---|---|---|
| 3,454,513 A * | 7/1969 | Azarian | 428/338 |
| 4,197,233 A | 4/1980 | Marshall | 260/37 EP |
| 4,286,988 A | 9/1981 | Castelli et al. | 106/15.05 |
| 4,323,599 A | 4/1982 | Marshall | 427/181 |
| 4,747,966 A * | 5/1988 | Maeno et al. | 252/512 |
| 4,895,881 A | 1/1990 | Bigner | 523/122 |
| 4,952,452 A * | 8/1990 | Nir et al. | 428/332 |
| 5,571,312 A * | 11/1996 | Andoe | 106/18.32 |
| 5,707,438 A | 1/1998 | Carlton | 106/480 |
| 5,760,103 A | 6/1998 | Wentzell | 523/122 |
| 5,773,508 A | 6/1998 | Tendo et al. | 524/549 |
| 6,548,145 B1 * | 4/2003 | Joedicke | 428/145 |
| 6,548,264 B1 * | 4/2003 | Tan et al. | 435/7.21 |
| 6,773,859 B1 * | 8/2004 | Fan et al. | 430/200 |
| 6,776,835 B1 * | 8/2004 | Andes et al. | 106/415 |

FOREIGN PATENT DOCUMENTS

EP 0 596 023 10/1998

* cited by examiner

Primary Examiner—Michael J. Feely
(74) Attorney, Agent, or Firm—Diane R. Meyers; Donald R. Palladino

(57) ABSTRACT

Anti-fouling compositions are disclosed. The compositions comprise a film-forming resin and an effective amount of silica coated copper. Methods for using the compositions are also disclosed, as are substrates coated with the compositions. The coatings find particular application on substrates that are submerged for extended periods of time in salt water. Methods for promoting oyster cultivation are also disclosed.

4 Claims, No Drawings

US 7,147,921 B2

ANTI-FOULING COATINGS CONTAINING SILICA-COATED COPPER

FIELD OF THE INVENTION

The present invention relates to compositions for reducing fouling of substrates that are in contact with water for extended periods of time. More specifically, the present compositions comprise silica-coated copper. Methods for using the same are also within the present invention.

BACKGROUND OF THE INVENTION

The accumulation of biological growth on boat hulls, ship bottoms, ocean rigs, fish nets and other objects immersed in or at the level of sea water is a well-known problem. Biological growth that accumulates on the surface of these objects includes, for example, barnacles, mollusks, annelids, hydroids, algae, diatoms, hydrides, bryozoans, and protozoans. The accumulation of this growth leads to problems such as lowered running speeds due to increase in weight and stream resistance in the case of boats and ships, and a significantly shortened useful life in the case of fish nets, ocean rigs and other structures. In addition to the increase in the cost of fuel for boats and ships, there is also a loss associated in terms of both time and money in the application of remedial measures to the surfaces in contact with water.

One of the most common methods for preventing the accumulation of biological growth on substrates is by the use of anti-fouling paints. Such paints are applied to all surfaces of the substrate that will be exposed to water. Unfortunately, most anti-fouling paints do not prevent fouling for extended periods of time. In addition, many of the compositions used in anti-fouling paints are becoming environmentally unacceptable. For example, copper salts are used in many anti-fouling paints, as is tributyltin. Tributyltin, however, has been the subject of recent environmental restrictions; the use of large amounts of copper is raising environmental concerns as well.

Anti-fouling compositions that result in reduced release of copper to the environment are therefore desired.

SUMMARY OF THE INVENTION

The present invention provides coating compositions comprising a film forming resin and silica-coated copper. The silica-coated copper is present in an amount effective for inhibiting unwanted foulant growth on substrates. "Foulant" refers herein to both "hard" and "soft" fouling organisms. "Soft fouling organisms" generally refers to plants and invertebrates such as algae, kelp, bacteria, diatoms, hydrides, bryozoans, protozoans, soft corals, tunicates, hydroids, sponges, anemones and the like; the term "hard fouling organisms" refers generally to invertebrates having some type of hard outer shell, such as barnacles, tube worms, mollusks and the like. "Anti-fouling" refers to the inhibition of growth of any of these foulants; "fouling" as used herein also encompasses "sliming", which is the term generally used to describe the opaque film that forms on the surface of submerged objects, usually initiated by soft fouling organisms. Thus, the present compositions are useful for inhibiting fouling of substrates exposed to aquatic environments for extended periods of time. The present compositions are particularly useful in marine environments where exposure would be to salt water, although fresh water anti-fouling is also accomplished by the present invention.

Because the copper used in the present invention is coated with silica, it is believed that a lower amount of copper will be released to the environment; the use of the silica coating on the copper is also believed to decrease the initial spike of copper release generally seen when a substrate with a copper-containing coating contacts the water. The inventors do not wish to be bound by any of these mechanisms, however.

DETAILED DESCRIPTION OF THE INVENTION

The present invention is directed to a coating composition comprising a film forming resin and an effective amount of silica coated copper.

The present compositions can be formed from film-forming resins that are liquid, that is, water-borne or solvent-borne systems. Any resin that forms a film and that is suitable for use in a water environment can be used according to the present invention, absent compatibility problems. Examples of polymers useful in forming the resin include hydroxyl or carboxylic acid-containing acrylic copolymers, hydroxyl or carboxylic acid-containing polyester polymers, oligomers and isocyanate or hydroxyl-containing polyurethane polymers, and amine or isocyanate-containing polyureas. These polymers are further described in U.S. Pat. No. 5,939,491, column 7, line 7 to column 8, line 2; this patent, as well as the patents referenced therein, are incorporated by reference herein. Curing agents for these resins are also described in the '491 patent at column 6, lines 6 to 62. Combinations of curing agents can be used.

In a particularly suitable embodiment, the film forming resins are amine resins, epoxy resins or mixtures thereof. Epoxy resins include DEN 444 from Dow Chemical and EPON 1001 from Resolution Performance Products. Amine resins include VERSAMINE 115, VERSAMIDE 125 and VERSAMIDE 140, from Henkel. Other suitable amines are described in U.S. Pat. No. 4,428,989, column 5, line 62 to column 6, line 38 and other suitable epoxides are described in the same patent at column 4, line 18 to column 5, line 60.

The film forming resin is generally present in the coating compositions in an amount greater than about 10 weight percent, such as greater than about 20 weight percent, and less than 98 weight percent, with weight percent being based on the total active component weight of the composition. "Active component weight" means the combined weight of the resin, curing agent if used, silica coated copper, and additives; that is, the weight of all the components except the solvent. For example, the weight percent of resin can be between 30 and 60 weight percent. When a curing agent is used, it is generally present in an amount of up to 50 weight percent; this weight percent is also based on the total active component weight of the coating composition.

Solvents in which the present coatings may be dispersed include, for example, water, alcohols, ketones, aromatic hydrocarbons, glycol ethers, esters or mixtures thereof. The solvent is generally present in amounts ranging from 5 to 80 weight percent based on total weight of the composition, such as 10 to 50 weight percent.

The present compositions further comprise an effective amount of silica coated copper. Silica coated copper is commercially available, such as from Eckart America as RESIST AT, LT or CT. The copper used in these commercial products is often a copper powder or flake that has been coated with silica. Typically, the silica coated copper metal is 90 percent or greater, such as 97 percent, copper and 10 percent or less, such as 3 percent, silicon dioxide. The silica coated copper can be in sizes ranging in average particle size from 10 to 40 microns.

The compositions of the present invention may further comprise other forms of copper. Copper can be introduced in many forms. For example, metallic copper, such as in particle or flake form, can be used. Alternatively, copper can be introduced in any other form such as copper oxide, copper (I) thiocyanate, copper naphthenate, copper octoate, copper rosinate, copper ethylene bisporene dithiocarbamate, copper carbonate, copper (II) chromate, copper (II) citrate, copper (II) ferrocyanate, copper (II) fluoride, copper (II) hydroxide, copper (II) quinoline, copper-oc-hydroquinoline, copper (II) oleinate, copper (II) oleate, copper (II) nitrate, copper (II) oxalate, copper (II) phosphate, copper (II) stearate, copper (II) sulfide, copper (II) tartrate, copper (II) tungstate, copper (I) bromide, copper (I) iodide, copper (I) rhodanide, copper (I) sulfide, and copper (II) sulfite. Copper (I) oxide ("cuprous oxide") is a particularly suitable form by which to introduce the copper.

As noted above, the present compositions comprise an effective amount of silica coated copper. The term "effective amount" is used herein to refer to that amount of silica coated copper that imparts anti-fouling capability to the present compositions. "Anti-fouling" as noted above refers to the inhibition of unwanted growth of the hard and/or soft fouling organisms discussed above. Any inhibition of fouling (which again includes sliming) is "anti-fouling" according to the present invention. Typically, an effective amount of silica coated copper is at least about 5 weight percent, such as at least about 10 weight percent, or at least about 15 weight percent, with weight percent being based on the total active component weight of the composition.

The compositions of the present invention can further contain conventional additives, such as plasticizers, anti-oxidants, light stabilizers, UV absorbers, thixotropic agents, anti-gassing agents, organic co-solvents, other biocides, antibiotics, pesticides, herbicides, surfactants, flow-control additives and catalysts. Any such additives known in the art can be used, absent compatibility problems. Such additives, if used, will typically comprise less than 20 weight percent of the composition, with weight percent being based on total weight of the composition.

Any of various organic or inorganic pigments can also be included in the present compositions. Examples include aluminum oxide, barium sulfate, calcium carbonate, carbon black, clay, iron oxide, mica, silica, talc, titanium dioxide, phthalocyanine blue and phthalocyanine green.

The present invention is further directed to a method for inhibiting fouling on a submerged substrate comprising applying to the substrate any of the anti-fouling compositions described above. The compositions can be applied by any conventional method such as brushing, dipping, flow coating, roll coating, conventional and electrostatic spraying. Typically, dry film thickness for the present coatings can range between 1 and 15 mils, such as between 2 and 10 mils or about 6 mils.

Substrates coated by the present compositions are also within the scope of the present invention. Suitable substrates can be made from any material subject to fouling including, metallic and nonmetallic substrates, such as fiber glass and like. The substrates can be moving (such as boats or ships) or fixed structures including structures that are used in the processing of bulk water. Substrates treated according to the present invention will generally be those that are at or beneath the water's surface for extended periods of time, i.e. greater than about four months ("submerged substrate").

It has been surprisingly discovered that while the present compositions inhibit growth of unwanted foulants, they do not inhibit growth of oysters. Growth of oysters on substrates treated according to the present invention may be observed, for example, about six months or more after treatment. This result was surprising since growth of virtually every other hard and soft fouling organism is inhibited. Accordingly, the present invention is further directed to a method for promoting oyster cultivation comprising applying to a substrate any of the compositions described above. The compositions can be applied in the manner described above.

As used herein, unless otherwise specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. Also, as used herein, the term "polymer" is meant to refer to oligomers and both homopolymers and copolymers; the prefix "poly" refers to two or more.

EXAMPLES

The following examples are intended to illustrate the invention, and should not be construed as limiting the invention in any way.

Example 1

Liquid coatings were prepared by sequentially mixing the following ingredients in the amounts shown (in grams) in Tables 1 and 2.

TABLE 1

|  | Sample 1 | | Sample 2 | | Sample 3 | | Sample 4 | | Sample 5 | | Sample 6 | |
| --- | --- | --- | --- | --- | --- | --- | --- | --- | --- | --- | --- | --- |
|  | Weight | % actives | Weight | % actives | Weight | % actives | Weight | % actives | Weight | % actives | Weight | % actives |
| Epoxy coating[1] | 32.95 | 51.5% | 32.95 | 50.3% | 33.0 | 39.3% | 32.95 | 39.3% | 33.0 | 38.6% | 32.95 | 38.6% |
| Cuprous oxide[2] | — | — | — | — | 16.9 | 23.8% | — | — | 16.9 | 23.3% | — | — |
| Marine anti-fouling agent[3] | — | — | — | — | — | — | — | — | 4.33 | 1.8% | — | — |
| 10% menthol in butanol[4] | — | — | — | — | 13.0 | 1.8% | — | — | 13.0 | 1.8% | — | — |
| Amine curative[5] | 32.05 | 46.1% | 32.05 | 45.0% | 32.0 | 35.1% | 32.05 | 35.1% | 32.0 | 34.5% | 32.05 | 34.5% |
| 10% menthol | 13.0 | 2.4% | 13.0 | 2.3% | — | — | 13.0 | 1.8% | — | — | 13.0 | 1.8% |

TABLE 1-continued

|  | Sample 1 | | Sample 2 | | Sample 3 | | Sample 4 | | Sample 5 | | Sample 6 | |
|---|---|---|---|---|---|---|---|---|---|---|---|---|
|  | Weight | % actives | Weight | % actives | Weight | % actives | Weight | % actives | Weight | % actives | Weight | % actives |
| in butanol |  |  |  |  |  |  |  |  |  |  |  |  |
| Silica-coated copper[6] | — | — | — | — | — | — | 16.9 | 23.8% | — | — | 16.9 | 23.3% |
| Marine anti-fouling agent | — | — | 4.39 | 2.4% | — | — | — | — | — | — | 4.33 | 1.8% |
|  | 78.0 | 100.0% | 82.4 | 100.0% | 94.9 | 100.0% | 94.9 | 100.0% | 99.2 | 100.0% | 99.2 | 100.0% |

[1]Obtained from PPG Industries, Inc. as PITT-GUARD 97-946.
[2]Obtained from OMG Americas as Grade AA cuprous oxide.
[3]Obtained from Rohn and Haas as SEA-NINE 211.
[4]Obtained as L(−)-Menthol (99.7%) from Acros Organics.
[5]Obtained from PPG Industries, Inc. as PITT-GUARD 97-949.
[6]Obtained from Eckart as RESIST AT (97% copper).

TABLE 2

|  | Sample 7* | | Sample 8 | |
|---|---|---|---|---|
|  | Weight | % actives | Weight | % actives |
| Epoxy coating | — | — | 25.00 | 34.0% |
| Cellosolve acetate | 67.5 | — | — | — |
| Xylene | 18.00 | — | — | — |
| MIBK | 10.00 | — | — | — |
| Gum rosin[7] | 51.00 | 12.6% | — | — |
| Vinyl resin[8] | 15.00 | 3.7% | — | — |
| Tricresyl phosphate[9] | 11.00 | 2.7% | — | — |
| Thixotrope[10] | 7.5 | 1.9% | — | — |
| Cuprous oxide | 320.00 | 79.1% | — | — |
| Silica-coated copper[11] | — | — | 21.20 | 34.0% |
| Marine anti-fouling agent | — | — | 1.63 | 0.8% |
| Amine curative | — | — | 25.00 | 31.3% |
|  | 500.0 | 100.0% | 72.8 | 100.0% |

*Formulation adapted from Protective Painting of Ships by T. A. Banfield; p. 68, F.43.
[7]Obtained from Akzo Nobel.
[8]Vinyl resin obtained from Union Carbide as VYHH.
[9]Obtained from Fisher Scientific.
[10]Obtained from Elementis Specialties as THIXATROL ST.
[11]Obtained from Eckart as RESIST LT (97% copper).

Previously primed one-quarter inch thick steel panels were coated with Samples 1–8 prepared as described above. Samples were applied by air atomized hand spray and allowed to dry at room temperature before shipment to the test site. The coatings on all the panels had a dry film thickness of 3.0 to 5.0 mils. The coated panels were then submerged in salt water at Ponce Inlet, Fla. The panels were checked every month for foulant growth. Table 3 provides foulant growth at four months for Samples 1–6 and Table 4 at 15 months for Samples 7 and 8. A blank rating (i.e. "—") in the tables means that there was none of that particular fouling on the panels. All measurements shown under the sub-heading "size" are in millimeters, and "%" refers to the percent of the area on the panel that was affected.

Growth was rated on a scale of 0–10, 10=clean or no fouling and 0=complete failure.

Tr(s)=trace(s) of foulant growth.

"S" stands for seed barnacle, which is the stage of a barnacle right after it settles onto a surface. The size of a barnacle during the seed stage is less than 1 mm. Thus, the description "S–18", for example, means that a panel had barnacles ranging in size from seed to 18 mm.

TABLE 3

| | | | | | | | | | BRYOZOA | | | | SCUM |
|---|---|---|---|---|---|---|---|---|---|---|---|---|---|
| | | BARNACLES | | MOLLUSKS | | ANNELIDS | | HYDROIDS | ENCRUSTING | | FILAMENTOUS | ALGAE | & SILT |
| SAMPLE NO. | GEN PERF. | Rating | Size | Rating | Size | Rating | Size | Rating | % | Rating | % | Rating | % | % | Rating |
| 1 | 0 | | | | | Heavily fouled mainly by barnacles | | | | | | | | | 10 |
| 2 | 0 | | | | | Heavily fouled mainly by barnacles | | | | | | | | | 10 |
| 3* | 1 | 2 | S-18 | — | — | 10 | 5–20 | — | — | Trs | 3 | — | — | — | 10 |
| 4* | 9 | Trs | S-14 | — | — | 10 | 5–25 | — | — | 10 | 5 | — | — | — | 9 |
| 5* | 2 | 2 | S-18 | — | — | Trs | 3–20 | — | — | — | — | — | — | — | 10 |
| 6* | 9 | Trs | S-5 | — | — | 9 | 3–30 | — | — | 10 | 5 | — | — | — | 9 |

*These panels had some bryozoan "die-off".

TABLE 4

| | | | | | | | | | BRYOZOA | | | | SCUM | |
| SAMPLE NO. | GEN PERF. | BARNACLES Rating | Size | MOLLUSKS Rating | Size | ANNELIDS Rating | Size | HYDROIDS Rating | ENCRUSTING % | Rating | FILAMENTOUS % | Rating | ALGAE % | & SILT Rating |
|---|---|---|---|---|---|---|---|---|---|---|---|---|---|---|
| 7 | 10 | Trs | — | — | — | — | — | 6 | 40 | Trs | 2 | — | 10 | 6 |
| 8 | 10 | Trs | S-18 | — | — | — | — | 6 | 40 | Trs | 5 | — | 7 | 4 |

For the readings provided in Tables 3 and 4:
1) At time of inspection all panels were sprayed with street-pressure fresh water, then kept wet with salt water.
2) Scum and silt ratings were performed before the water rinse.
3) Panel edges and mounting holes were not considered during the ratings.

As shown in Table 3, at four months the composition of the present invention (Samples 4 and 6) gave results superior to those of Samples 3 and 5, which used cuprous oxide and also, in the case of Sample 5, a commercial anti-fouling agent. Samples 1 and 2, with non-copper containing anti-foulants, were completely fouled. After 15 months (Table 4), Sample 8 gives comparable performance to Sample 7, which was coated with a much larger amount of copper in the form of cuprous oxide.

Example 2

Panels treated as described above with Sample 6, and tested as described above, had oyster growth after about ten months.

Whereas particular embodiments of this invention have been described above for purposes of illustration, it will be evident to those skilled in the art that numerous variations of the details of the present invention may be made without departing from the invention as defined in the appended claims.

Therefore, what is claimed is:

1. A method for inhibiting fouling on a submerged substrate comprising applying to said substrate a coating composition comprising (i) a film forming resin comprising epoxy, and (ii) an effective amount of silica coated copper for inhibition of fouling.

2. The method of claim 1, wherein the silica coated copper is in flake form.

3. The method of claim 1, wherein said effective amount is five weight percent or greater, with weight percent being based on the total active component weight of the composition.

4. A method for promoting oyster cultivation, comprising applying to a substrate a coating comprising (i) a film forming resin comprising epoxy, and (ii) an effective amount of silica coated copper for inhibiting fouling, and submerging the substrate in water for at least six months.

* * * * *